US009651253B2

(12) United States Patent
Panesar et al.

(10) Patent No.: US 9,651,253 B2
(45) Date of Patent: May 16, 2017

(54) COMBUSTION APPARATUS

(75) Inventors: Raghbir S. Panesar, Glasgow (GB); Scott A. Hume, Glasgow (GB); Stuart D. Cameron, Glasgow (GB)

(73) Assignee: DOOSAN POWER SYSTEMS AMERICAS, LLC, Atlanta, GA (US)

( * ) Notice: Subject to any disclaimer, the term of this patent is extended or adjusted under 35 U.S.C. 154(b) by 1024 days.

(21) Appl. No.: 11/803,697

(22) Filed: May 15, 2007

(65) Prior Publication Data

US 2008/0286707 A1    Nov. 20, 2008

(51) Int. Cl.
*F23M 3/04* (2006.01)
*F23L 7/00* (2006.01)
*F23N 3/00* (2006.01)

(52) U.S. Cl.
CPC ............. *F23L 7/007* (2013.01); *F23N 3/005* (2013.01); *F23C 2202/30* (2013.01); *F23L 2900/07001* (2013.01); *F23L 2900/07006* (2013.01); *Y02E 20/322* (2013.01); *Y02E 20/344* (2013.01)

(58) Field of Classification Search
USPC .......... 431/8, 9, 10, 181, 187; 110/260–262
See application file for complete search history.

(56) References Cited

U.S. PATENT DOCUMENTS

| | | | |
|---|---|---|---|
| 2,072,845 A * | 3/1937 | Benolt ............................ 239/85 |
| 2,074,504 A * | 3/1937 | Fitch ............................ 110/106 |
| 3,356,075 A * | 12/1967 | Livingston ................. 122/479.1 |
| 3,727,562 A * | 4/1973 | Bauer ............................ 110/344 |
| 3,731,495 A * | 5/1973 | Coveney ......................... 62/651 |
| 3,894,834 A * | 7/1975 | Estes ............................ 431/174 |
| 4,052,138 A * | 10/1977 | Gieck ............................... 431/4 |
| 4,206,712 A * | 6/1980 | Vatsky ........................... 110/264 |
| 4,790,743 A * | 12/1988 | Leikert et al. .................... 431/8 |
| 4,863,371 A * | 9/1989 | Ho ................................... 431/9 |
| 4,909,727 A * | 3/1990 | Khinkis ........................ 431/10 |
| 5,545,031 A * | 8/1996 | Joshi et al. ....................... 431/8 |
| 5,567,141 A * | 10/1996 | Joshi et al. ....................... 431/8 |
| 5,724,901 A * | 3/1998 | Guy et al. ..................... 110/346 |
| 5,743,723 A * | 4/1998 | Iatrides et al. ................... 431/8 |
| 5,803,725 A * | 9/1998 | Horn et al. .................... 431/187 |
| 5,855,648 A * | 1/1999 | Prasad et al. ..................... 95/54 |
| 5,888,272 A * | 3/1999 | Prasad et al. ..................... 95/54 |

(Continued)

FOREIGN PATENT DOCUMENTS

| | | |
|---|---|---|
| EP | 1 327 823 A2 | 7/2003 |
| GB | 2 427 261 A | 6/2005 |

(Continued)

OTHER PUBLICATIONS

European Search Report EP 08 15 6300, Aug. 11, 2011, 5 pages.

(Continued)

*Primary Examiner* — Steven B McAllister
*Assistant Examiner* — Desmond C Peyton
(74) *Attorney, Agent, or Firm* — Sughrue Mion, PLLC

(57) ABSTRACT

A combustion apparatus comprising: a combustion chamber; a primary fuel input conduit for supplying a fuel to the combustion chamber; a secondary input conduit for supplying a combustion gas to the combustion chamber; and combustion gas supply means, wherein the combustion gas supply means is adapted to switchably supply one of air and an oxygen rich gas to at least the secondary input conduit.

9 Claims, 4 Drawing Sheets

(56) References Cited

U.S. PATENT DOCUMENTS

| | | | |
|---|---|---|---|
| 5,921,771 A * | 7/1999 | Kobayashi | 432/181 |
| 6,071,116 A * | 6/2000 | Philippe et al. | 432/29 |
| 6,149,714 A * | 11/2000 | Kobayashi | 95/54 |
| 6,190,160 B1 * | 2/2001 | Hibon et al. | 431/12 |
| 6,276,928 B1 * | 8/2001 | Joshi et al. | 432/26 |
| 6,382,958 B1 * | 5/2002 | Bool et al. | 431/2 |
| 6,394,043 B1 * | 5/2002 | Bool et al. | 122/488 |
| 6,519,973 B1 * | 2/2003 | Hoke et al. | 65/134.4 |
| 6,524,097 B2 * | 2/2003 | Hoke et al. | 431/8 |
| 6,596,220 B2 * | 7/2003 | Gross | 266/44 |
| 6,659,762 B2 * | 12/2003 | Borders et al. | 431/8 |
| 6,699,029 B2 * | 3/2004 | Kobayashi et al. | 431/10 |
| 6,699,030 B2 * | 3/2004 | Bool et al. | 431/10 |
| 6,699,031 B2 * | 3/2004 | Kobayashi et al. | 431/10 |
| 6,702,569 B2 * | 3/2004 | Kobayashi et al. | 431/10 |
| 6,702,570 B2 * | 3/2004 | Bool et al. | 431/11 |
| 6,907,845 B2 * | 6/2005 | Krebs | 122/7 R |
| 6,978,726 B2 * | 12/2005 | Kobayashi et al. | 110/347 |
| 7,320,288 B2 * | 1/2008 | Marin et al. | 110/345 |
| 7,438,005 B2 * | 10/2008 | Kobayashi et al. | 110/345 |
| 7,833,009 B2 * | 11/2010 | Joshi et al. | 431/12 |
| 8,636,500 B2 * | 1/2014 | Kloosterman | F22B 35/00 431/11 |
| 2002/0127505 A1 * | 9/2002 | Kobayashi et al. | 431/10 |
| 2005/0058958 A1 * | 3/2005 | Kobayashi et al. | 431/10 |
| 2006/0057517 A1 * | 3/2006 | Joshi et al. | 431/12 |
| 2006/0199120 A1 * | 9/2006 | Kalina | 431/9 |
| 2007/0207419 A1 * | 9/2007 | Patrick | 431/8 |
| 2007/0231761 A1 * | 10/2007 | Rosen et al. | 431/350 |
| 2008/0160464 A1 * | 7/2008 | Ghani | F23C 3/008 431/9 |
| 2009/0220900 A1 * | 9/2009 | Kobayashi et al. | 431/12 |

FOREIGN PATENT DOCUMENTS

| | | |
|---|---|---|
| WO | WO 00/12767 | 2/1999 |
| WO | WO 2004/007351 | 1/2004 |
| WO | WO 2007/126980 | 3/2007 |

OTHER PUBLICATIONS

International Search Report, PCT/AT99/00045, Jul. 21, 1999, 8 pages.

Hamid Farzan et al. "Pilot-Scale Evaluation of Coal Combustion in an Oxygen-Enriched Recycled Flue Gas", 30th International Conference on Coal Utilization and Fuel Systems, Apr. 17, 2005, pp. 1-7.

Fabienne Châtel-Pélage et al. "Applications of Oxygen for NOx Control and $CO_2$ Capture in Coal-Fired Power Plants", 2006, pp. 119-142, vol. 10, No. 3.

John B. Kitto, Steven C Stultz "Steam/its generation and use", 2005, pp. 14-4 to 14-15, 41st edition, The Babcock & Wilcox Company, Barberton, Ohio, U.S.A.

Facts and Arguments provided in Notice of Opposition dated Jun. 21, 2016 against corresponding European Patent EP 1992876.

* cited by examiner

COMBUSTION APPARATUS

The present invention relates to combustion apparatus. In particular, but not exclusively, the invention relates to combustion apparatus capable of air and oxyfuel firing and utilizing flue gas recirculation.

There is a widespread desire to reduce the causes of global warming, and an increased carbon dioxide level in the atmosphere is considered to be the most dominant factor. One source of the emission of carbon dioxide to the atmosphere is the combustion of fossil fuels in power plants. One response to this is to seek to capture and store the carbon dioxide emitted during combustion.

Carbon dioxide capture techniques are often categorised into the three groups of pre-combustion capture, post-combustion capture, and oxyfuel combustion capture. In the latter approach, near pure or pure oxygen is supplied to the boiler's combustion system (oxyfuel combustion), and also at least a portion of the carbon dioxide rich flue gas is recycled back to the boiler (flue gas recirculation). Oxyfuel combustion produces a flue gas which primarily consists of carbon dioxide and water vapour. The flue gas is not diluted with nitrogen (as occurs using air combustion) and so the carbon dioxide can be readily captured. The reduced levels of nitrogen can also reduce the formation of NOx (a term used to cover nitric oxide, nitrogen dioxide and nitrous oxide). Flue gas recirculation itself is also known to reduce the formation of NOx.

It is desirable that this approach can be used for retrofitting existing boilers as well as for new plant designs. Also, for an existing or new boiler, it is often desirable that the boiler can selectively and switchably be fired using air or using oxygen and recycled flue gas. For instance, during start up or shut down of the boiler, air firing achieves a stable low load operation. After start up, there can be a switch to oxygen and flue gas recirculation to achieve carbon dioxide capture. It is also desirable that the boiler can operate across the full load range in both the air firing and oxyfuel mode. However, the combustion of a fossil fuel, such as pulverized coal, in an oxygen rich gas results in a high flame temperature, which can cause ash melting and may actually increase the formation of NOx. Conventionally, in prior art apparatus, air is still supplied to the fuel input (primary stream) of the boiler. If high levels of oxygen are supplied directly to the fuel input, there can also be premature combustion as the fuel catches fire, which is wasteful and hazardous. However, the conventional use of air again increases the levels of nitrogen present, leading to the formation of NOx. It is desirable to be able to control flame temperature while optimizing, or at least maintaining, the efficiency of the boiler. It is desirable to eliminate this source of nitrogen.

On the other hand, there are a number of disadvantages associated with supplying oxygen directly to the burner section of the boiler (the secondary stream). For instance, modern low NOx burners typically utilize staged combustion to minimize the oxidation of nitrogen present in the fuel, and a higher oxygen supply to the burners may be counterproductive in this respect. Also, the supply of oxygen directly to the burner section results in particular thermal characteristics from the overall system. It is then more difficult, or less efficient, to switch between air firing and firing using an oxygen enriched gas. It is desirable to be able to limit the oxygen content supplied to the burners. It is desirable to be able to vary the oxygen content supplied to the burners for a number of reasons, such as to optimize performance or to allow switching between air firing and firing using an oxygen enriched gas.

Furthermore, the fuel used can significantly affect the performance of the boiler. For instance, when using very low volatile coal, it is desirable to optimize the oxygen content to assist ignition of the volatile matter. It is therefore desirable to vary the oxygen content of the fuel stream.

According to a first aspect of the present invention, there is provided a combustion apparatus comprising:

a combustion chamber;

a primary fuel input conduit for supplying fuel to the combustion chamber;

a secondary input conduit for supplying combustion gas to the combustion chamber; and combustion gas supply means, wherein the combustion gas supply means is adapted to switchably supply either air or an oxygen rich gas to at least the secondary input conduit.

The term "oxygen rich gas" is intended to cover a quantity of gas having a proportion of oxygen which is greater than 21% by volume and including pure oxygen.

Preferably the combustion gas supply means is adapted to supply substantially pure oxygen.

Preferably the combustion gas supply means is adapted to selectively supply a mixture of the oxygen rich gas and a second gas to the secondary input conduit. Preferably the second gas does not include air. Preferably the second gas does not include nitrogen. The mixture flowing within the secondary input conduit may have any proportion of oxygen and may be less than 21% by volume.

Preferably the combustion gas supply means is adapted to switchably supply either air or the oxygen rich gas to both of the primary fuel input conduit and the secondary input conduit.

Preferably the combustion gas supply means includes varying means for varying the proportion of air or oxygen rich gas supplied to one or both of the primary fuel input conduit and the secondary input conduit.

Preferably the combustion apparatus comprises a boiler for generating steam.

Preferably the fuel used is coal, most preferably pulverized coal. Preferably the combustion gas supply means is adapted to supply either air or the oxygen rich gas to the primary fuel input conduit such that the air or oxygen rich gas at least assists in transporting the fuel to the combustion chamber. Preferably the combustion gas supply means includes one or more fan units.

Preferably the secondary input conduit supplies air or oxygen rich gas to one or more burners provided at the combustion chamber.

The combustion apparatus may include one or more tertiary input conduits fluidly connected to the combustion gas supply means for supplying air or the oxygen rich gas directly to the combustion apparatus or to another component of the combustion apparatus.

Preferably the combustion apparatus includes a flue gas recirculation conduit. Preferably the flue gas recirculation conduit is fluidly connected to at least one of the primary fuel input conduit and the secondary input conduit such that a mixture of air or the oxygen rich gas and flue gas is supplied to the combustion chamber. Preferably the flue gas recirculation conduit is fluidly connected to both of the primary fuel input conduit and the secondary input conduit.

An embodiment of the present invention will now be described, by way of example only, with reference to the accompanying drawings, in which.

Figure 1:
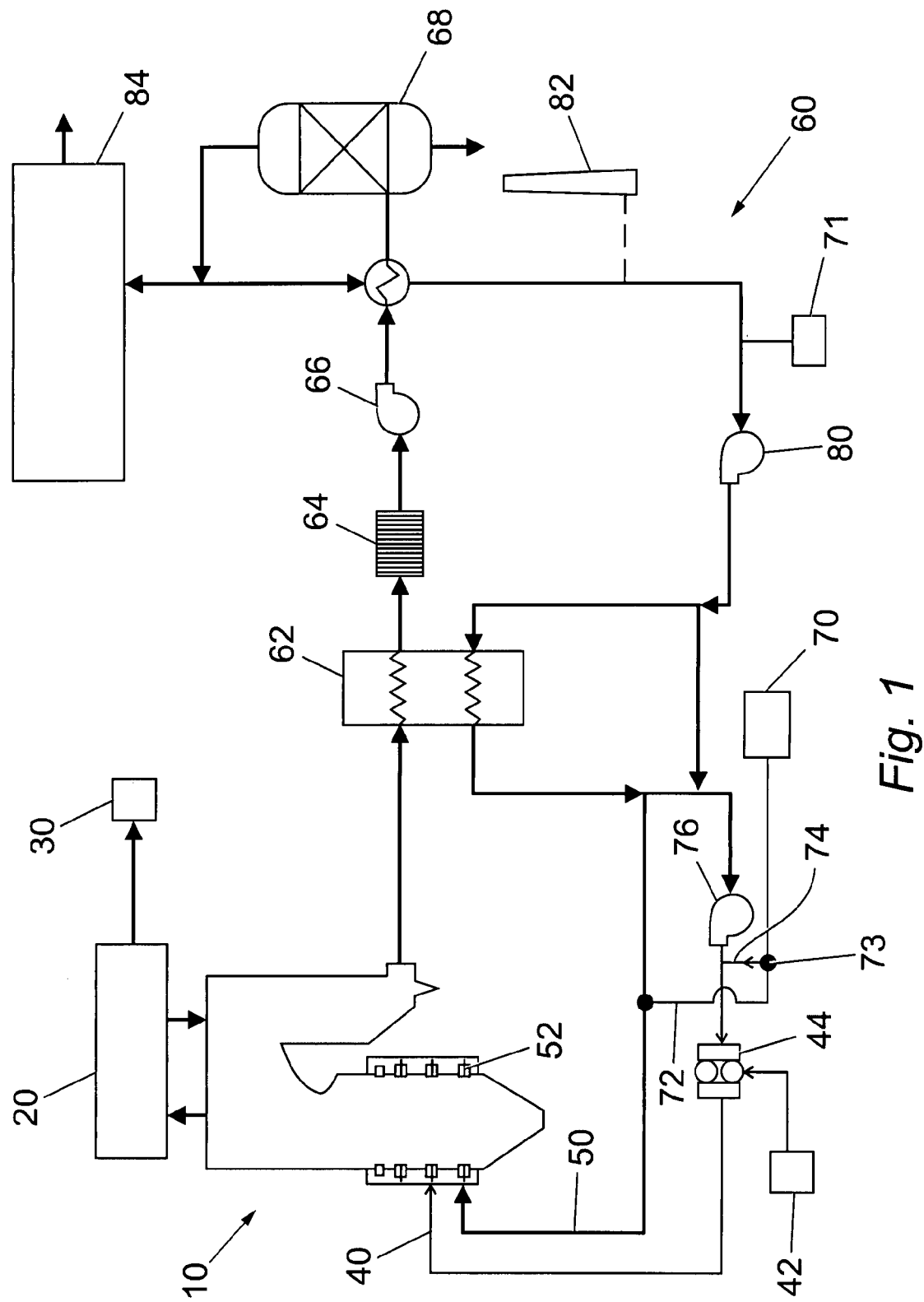
FIG. 1 is a simplified diagrammatic view of a combustion apparatus according to the invention.

FIG. 1 shows a combustion apparatus including an air and oxyfuel fired boiler 10 for generating steam which is used to operate turbines 20 for producing electric power from generating apparatus 30.

The boiler 10 has a primary fuel input conduit 40 for supplying coal from a fuel store 42 via a pulverizing mill 44 to the boiler 10. The boiler 10 also has a secondary input conduit 50 for supplying a combustion gas to a number of burners 52 fitted to the boiler 10.

The combustion apparatus includes combustion gas supply means which includes an oxygen supply 70 and an air supply 71. The combustion gas supply means is controllable to switch between supplying either air or an oxygen rich gas in the form of pure oxygen. Conduits 72, 74 fluidly connect the oxygen supply 70 of the combustion gas supply means to both of the primary fuel input conduit 40 and the secondary input conduit 50. Although these conduits are fluidly connected, they may not be directly or physically connected. For instance, in the example of FIG. 1, conduit 74 is directly connected to a conduit leading to the mill 44, which in turn is connected to the primary fuel input conduit 40.

The combustion gas supply means also includes a valve 73 which is controllable to vary the proportion of oxygen which is supplied to the primary fuel input conduit 40 and the secondary input conduit 50. For instance, 70% of the available combustion gas may be supplied to the primary fuel input conduit 40 and 30% to the secondary input conduit 50, or 40% of the available combustion gas may be supplied to the primary fuel input conduit 40 and 60% to the secondary input conduit 50.

The combustion apparatus also includes a flue gas recirculation system 60. Flue gas is drawn through a heater 62 and electrostatic precipitator (ESP) 64 using a fan 66. The flue gas is de-ashed by the ESP 64. The clean flue gas then passes to a flue gas desulphurization (FGD) unit 68 and then to a carbon dioxide purification and compression unit 84.

A large proportion of the flue gas is recycled back through the heater 62, drawn by another fan 80, while the remainder bypasses the heater 62 to provide a tempering stream. A proportion of the flue gas then flows to the secondary input conduit 50, while the remainder is passed to the primary fuel input conduit 40 via the mill 44. In the air firing mode or a transition mode (but not the oxyfuel mode), a proportion of the flue gas up to 100% is not recycled but is emitted to atmosphere via a stack 82. The proportion of flue gas which is recycled through the heater 62 then passes to the secondary input conduit 50.

The flue gas recirculation system 60 is therefore fluidly connected to the secondary input conduit 50 such that flue gas is supplied to the boiler 10. The system 60 is also fluidly connected to the primary fuel input conduit 40.

When the combustion gas supply means is switched to supplying oxygen, the oxygen is supplied to the primary fuel input conduit 40 which is fluidly connected to a conduit of the flue gas recirculation system 60 such that a mixture of flue gas and oxygen are supplied to the mill 44 using a fan 76. This mixture transports the pulverized coal to the boiler 10. The combustion gas supply means also supplies oxygen to the secondary input conduit 50 such that a mixture of oxygen and flue gas is supplied to the boiler 10. The supply of oxygen to both the primary fuel input conduit 40 and the secondary input conduit 50 occurs downstream of the heater 62.

Figure 2:
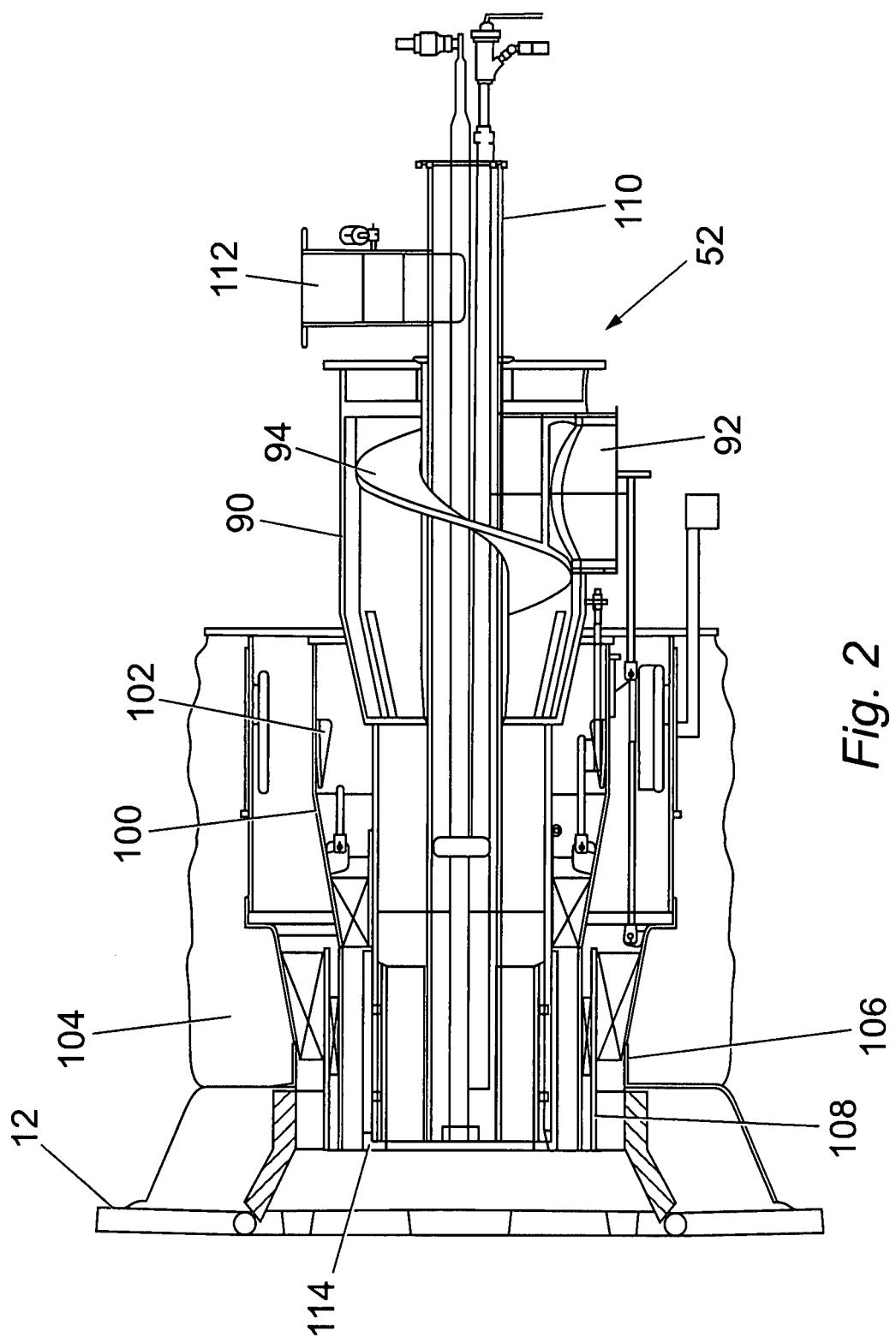
FIG. 2 is a sectional side view of a burner of the combustion apparatus of FIG. 1.

A suitable burner 52 fitted to a boiler wall 12 is shown in FIG. 2. Full burner thermal rating is achievable with pulverized fuel air firing and with pulverized fuel oxyfuel firing. Each burner 52 has five co-axially arranged tubular partitions defining annular passages for one, or a mixture, of fuel, oxygen, flue gas, and air.

Each burner 52 has a primary tube 90 which is fluidly connected to the primary fuel input conduit 40. A mixture of fuel, recycled flue gas and oxygen is supplied to a scroll plate 94 of the primary tube 90 via a tangential connection 92 (or air is supplied during air firing).

Each burner 52 also has a secondary tube 100 which is fluidly connected to the secondary input conduit 50. A mixture of recycled flue gas and oxygen is supplied to apertures 102 provided in the secondary tube 100 from a wind box 104 surrounding the burner 52 (or air is supplied during air firing).

Each burner 52 includes two tertiary tubes 106, 108. Also, a core tube 110 is provided, which includes a radial connection 112. These tubes may be fluidly connected to one or both of the combustion gas supply means and the flue gas recirculation system 60.

In operation, fuel within the primary tube 90 is given an axial and a circumferential momentum by the scroll plate 94. The flow is discharged past a lip 114 as a vigorously eddying flow which ignites at the lip 114 defining an initial combustion region. Reducing conditions prevail within this region such that there is minimal oxidation of the nitrogen in the fuel. The amount of oxygen in the core tube 110 is also limited to maintain these conditions.

Flow from the secondary 100 and tertiary 106, 108 tubes forms an envelope around the initial combustion region so that combustion of the fuel is completed downstream under oxidizing conditions.

Figure 3:
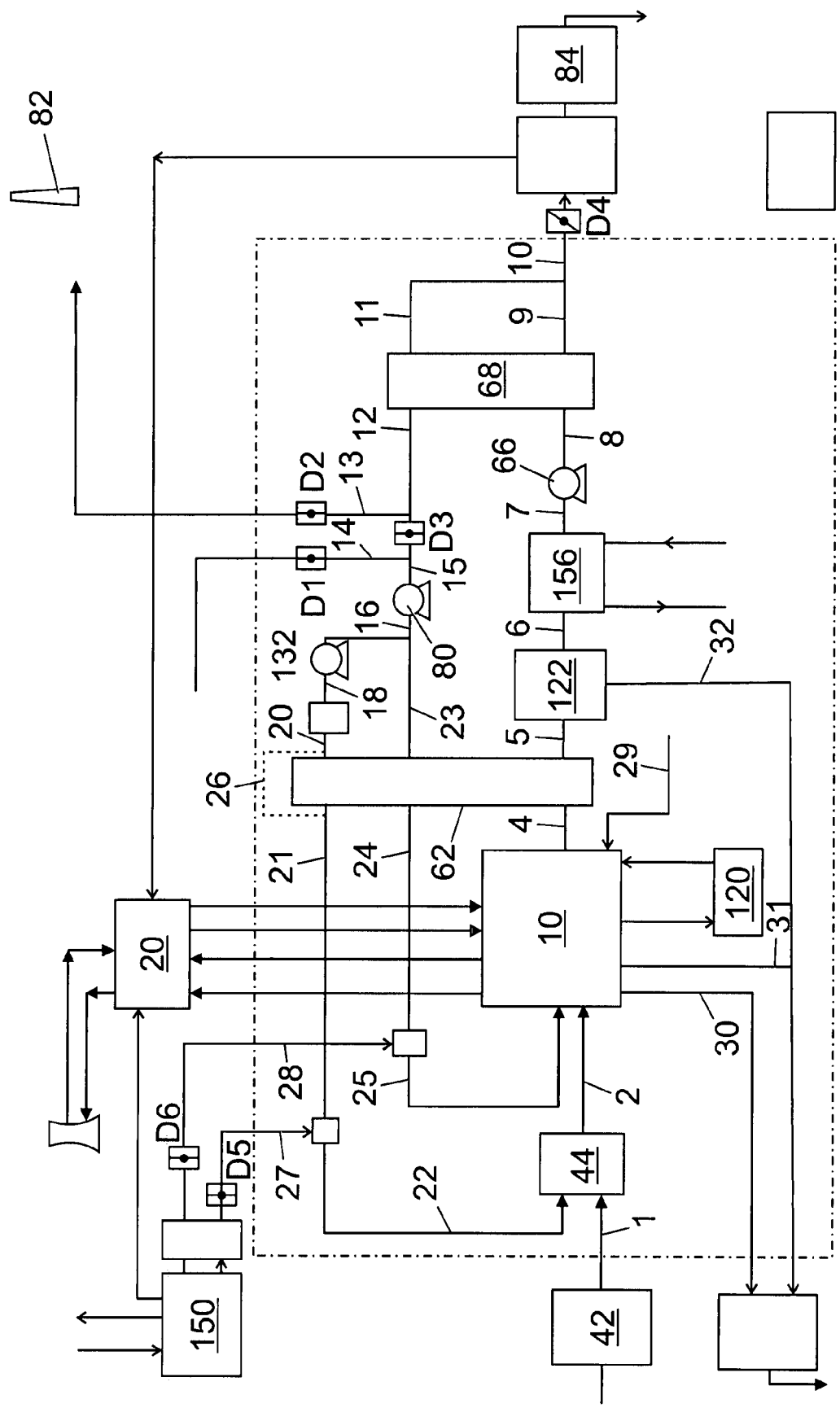
FIG. 3 is a more detailed diagrammatic view of a combustion apparatus according to the invention in an air fired mode.

FIG. 3 is a more detailed diagrammatic view of a combustion apparatus according to the invention which is in an air firing mode and at full load.

A conventional coal handling system 42 supplies raw coal along Stream 1 from the coal bunkers to milling equipment 44 where coal is pulverized and transported with air along Stream 2, which is the primary fuel input conduit, to the combustion chamber of the boiler 10.

The combustion air and flue gas streams are designed for balanced draught operation. The combustion air system includes forced draught fans 80, primary air fans 132 and gas-gas heaters 62 for heating the combustion air. From downstream of the gas-gas heaters 62, heated air is split into primary air and secondary air. In this mode, the heater is a gas-air heater.

Primary air is transported along Stream 22 to the milling equipment 44 for coal drying and pulverized fuel transportation along Stream 2 (the primary fuel input conduit). Cold primary air (Stream 26) is used to provide the tempering air stream for mill outlet temperature control.

The secondary air travelling along Stream 25 (the secondary input conduit) is supplied to the combustion chamber of the boiler 10. The secondary air splits into windbox air and overfire air (a multi-stage combustion system incorporating overfire air ports). The windbox air is supplied directly to the burners (not shown in FIG. 3).

As the boiler plant design is based on a balanced draught boiler design, it is capable of firing the design specified coal range throughout the entire boiler load range without operational constraints on air firing. The balanced draught furnace is designed with an appropriate combustion system to meet in-furnace primary NOx limits and combustion efficiency specifications as appropriate. To reduce pollutant constituents of the flue gas to below allowable emission limits, the boiler island plant employs appropriate emissions control plant located in the flue gas downstream. This plant comprises DeNOx plant 120, particulate and mercury removal 122 and DeSOx plant 68.

The products of combustion leave the furnace and are cooled by the boiler's heating surfaces downstream. The flue gas leaving the furnace enters the boiler's convective pass where steam generated in the furnace walls is further superheated and reheated for power generation. The boiler unit comprises a radiant furnace and radiant and convective heating surfaces. The furnace/boiler walls comprise gastight membrane surfaces to minimize air ingress. Heating surface arrangements are provided which avoid inadmissible slagging or fouling and inadmissible steam flow and temperature. Appropriate flow velocities are selected to ensure both adequate cooling of the water/steam side and no significant erosion potential on the flue gas side.

Downstream of the boiler convective pass, incorporating DeNOx plant 120, the flue gas flowing along Stream 4 is cooled in a gas-gas heater 62, as used to preheat the incoming cold combustion air in Stream 16. The gas-gas heater 62, such as a 3-stream/tri-sector design, is suitable for use during both air and oxyfuel operation, and any proportion in between. The flue gas leaving the gas-gas heater 62 at Stream 5 is de-dusted through particulate removal plant 122 where the de-dusted gas (Stream 7) is fed to the downstream induction draught fan 66 and DeSOx plant 68. The outlet from the DeSOx plant 68 (Stream 12) then exhausts to the flue stack via Stream 13, or alternatively may be exhausted directly to a cooling tower without the need for reheat.

Figure 4:
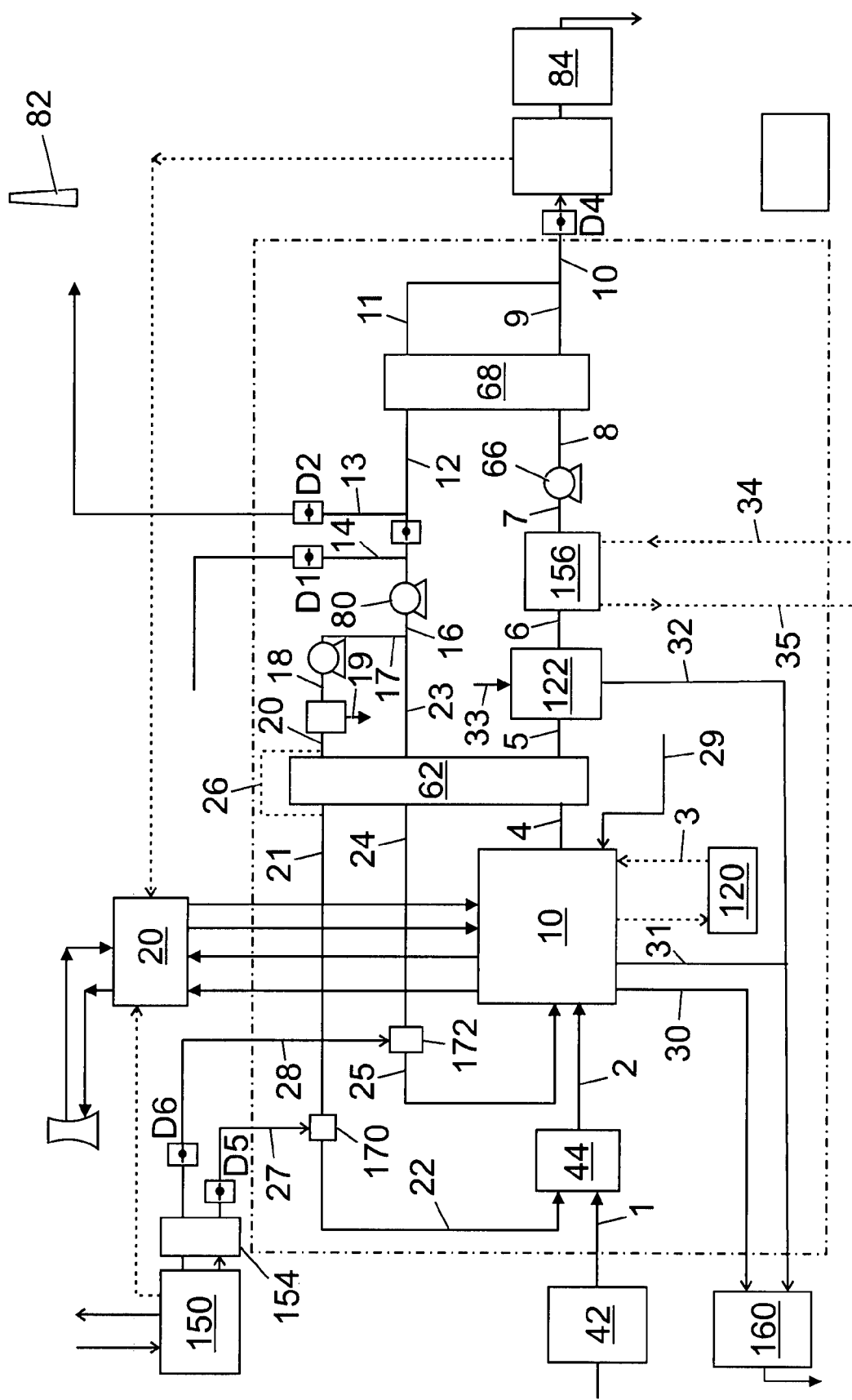
FIG. 4 is a diagrammatic view of the combustion apparatus of FIG. 3 in an oxyfuel fired mode.

FIG. 4 is a detailed diagrammatic view of the combustion apparatus in an oxyfuel firing mode and at full load.

The combustion apparatus is started and shutdown in a conventional manner using air firing with transfer over to the oxyfuel mode of operation occurring at the appropriate minimum stable load combustion conditions. At this load condition, the forced draught fan air intake D1 is gradually closed whilst the stack damper D2 is throttled to enable the flue gases to be recycled to the boiler plant 10. Simultaneously, substantially pure oxygen is supplied from an air separation unit/oxygen plant 150 and introduced into both the primary flue gas recirculation stream via damper D5 and the secondary flue gas recirculation stream via damper D6.

When appropriate carbon dioxide levels in the flue gas have been reached, flue gas is admitted to the carbon dioxide purification and compression plant 84 by flow balance control between the flue gas recycle damper D3 and damper D4. Flue gas monitoring equipment is used to provide an indication to the boiler operator of when the flue gas carbon dioxide quality meets the requirements for safe supply of this oxyfuel flue gas to the carbon dioxide purification and compression plant 84.

As before, a conventional coal handling system supplies raw coal along Stream 1 from the coal bunkers to milling equipment 44. The coal is pulverized and transported with oxyfuel flue gas along Stream 2 (primary fuel input conduit) to the combustion chamber of the boiler 10.

Air is separated prior to the boiler's combustion system using commercially available air separation units 150 which separate the oxygen from the ambient air feed. Therefore, nitrogen is not used during oxyfuel combustion. No combustion air is supplied to the boiler system, although a degree of air ingress (Stream 29) may occur due to the balanced draught boiler plant design. Appropriate mechanical design can minimize this air ingress.

The oxygen from the air separation unit 150 is preheated through a heat exchanger 154, using appropriate available sources of heat. The preheated oxygen in Stream 27 and the primary flue gas recycle in Stream 21 are mixed at a mixer 170 before entering the milling plant via Stream 22. The oxygen concentration in the resulting mixed Stream 22 is limited to the equivalent of air. The primary flue gas recycle stream (Stream 21) is delivered de-ashed, cleaned, dried and preheated with the volumetric flow rate set to meet the requirements of the milling plant and product temperature.

The secondary flue gas recycle stream (Stream 24) is mixed at a mixer 172 with preheated oxygen in Stream 28 and fed to the boiler's combustion system via Stream 25 (secondary input conduit 50). The carbon dioxide in Stream 25 replaces the part of the ballasting inert bulk gas formerly provided by atmospheric nitrogen. The secondary flue gas recycle stream is de-ashed, cleaned and preheated. The secondary flue gas is supplied to attain combustion equipment performance through the delivery of stable and efficient coal combustion. The secondary flue gas also controls furnace combustion temperatures comparable to power generation air-fired plant and achieves rated boiler thermal performance.

The flue gas is recirculated and split to provide primary flue gas recirculation and secondary flue gas recirculation. Oxygen injection is downstream of the gas-gas heaters 62 and flue gas fans due to the risk of particulate impingement on fan blades. The oxygen injection system is designed to promote efficient mixing of oxygen and flue gas.

Primary oxygen mixing is upstream of the milling equipment 44. The oxygen concentration in the primary flue gas recirculation stream upstream of the milling plant is arranged to be approximately equivalent to the oxygen concentration in air.

The balanced draught boiler design is capable of firing the design specified coal range throughout the entire boiler load range without operational constraints on oxyfuel firing. The furnace is designed with an appropriate combustion system which incorporates low NOx axial swirl pulverized fuel burners, suitable for both air and oxyfuel firing and any proportion in between, and multi-stage combustion system (overtire combustion ports) in the furnace walls for in-furnace primary NOx reduction and combustion efficiency specifications as appropriate. The boiler plant is designed with full control range suitable for full load operation on air or oxyfuel mode of operation and any proportion in between. The boiler plant retains full air-firing capability with appropriate emissions control plant.

The products of combustion leave the radiant furnace and are cooled by the boiler's heating surfaces downstream. The oxyfuel flue gas leaving the furnace enters the boiler's convective pass where supercritical steam generated in the furnace walls is further superheated and reheated for power generation. An economizer is situated in the convective gas pass.

The DeNOx unit 120 is adapted such that it can be bypassed during oxyfuel operation. Oxyfuel flue gas in Stream 3 is further cooled in the gas-gas heater 62 (Streams 4 and 5) which is used to preheat the incoming oxyfuel recycle flue gas in Streams 20 and 23. The flue gas in Stream 5 leaving the gas-gas heater 62 is de-dusted through particulate removal plant 122 before being cooled in a downstream heat recovery unit 156. The de-dusted and cooled flue gas in Stream 7 is fed to the induction draught fan 66 downstream.

Downstream of the induction draught fan 66 (Stream 8), the flue gas enters the DeSOx plant 68. The DeSOx plant 68 is employed to treat all of the flue gas and provide clean oxyfuel flue gas recycle so as to limit the corrosive gaseous components in the oxyfuel flue gas recycle stream to the milling equipment 44 and boiler plant 10 to concentrations no worse than those experienced during air firing.

Downstream of the DeSOx plant 68, the cold oxyfuel flue gas is split into two streams. One stream (Stream 10) provides the net oxyfuel flue gas feed stream to the carbon dioxide purification and compression plant 84. The remaining clean flue gas stream (Stream 11) is recycled back to the boiler system via a forced draught fan 80 and Stream 16. After this splitting, flue gas in Stream 11 is reheated, as required, through a gas-gas heater within the DeSOx plant 68. The flue gas in Stream 12 then passes on through the downstream fan and flue gas recirculation ductwork.

Flue gas in Stream 11 is split to provide a primary flue gas recycle stream (Stream 17) and a secondary flue gas recycle stream (Stream 23). The cold oxyfuel flue gas in Stream 20 is also used to provide the tempering gas stream (Stream 26) for mill outlet temperature control and mill sealing.

The moisture content of the oxyfuel flue gas will be at a higher level than with conventional air-firing derived flue gas due to the effect of flue gas recycle. In addition, the use of a wet scrubber DeSOx system, if appropriate, will increase the flue gas moisture content, and the recycle flue gas will be saturated at the final temperature at which the flue gas is cooled. As appropriate, a moisture removal plant can be located either in the full flue gas stream (Stream 9) or in the primary flue gas recycle stream (Stream 20) to the gas-gas heater 62. The dried oxyfuel flue gas stream (Stream 20) is preheated in the gas-gas heater 62 and tempered as required (Stream 26), providing the primary flue gas recycle stream (Stream 21).

The oxyfuel secondary flue gas recycle stream is delivered preheated (Stream 24) to the boiler's combustion system from the gas-gas heater 62. Both the primary and the secondary flue gas recycle streams are preheated with heat recovered from the hot oxyfuel flue gas exiting the boiler system along Stream 4.

A conventional ash handling system 160 serves the ASC boiler coarse ash via Stream 30, fly ash via Stream 31 and ESP fly ash via Stream 32. Overall oxyfuel plant performance is optimized through process integration including recovery of low grade from the oxyfuel boiler island (Stream 35).

Dual air/oxyfuel burners are designed to operate up to their full thermal rating for 100% air-firing or 100% oxyfuel firing or any proportion in between. The burners are designed to be as robust and mechanically simple as possible, offering long life and long periods of continuous operation and dramatically simplifying commissioning and operating procedures.

Each burner includes a primary combustion stream either as primary air or oxygen enriched primary flue gas recycle provided by the primary air fans which is combined with the pulverized fuel at the mills 44. The resulting mixture is fed to the burner and delivered into the combustion chamber.

Additional oxygen for completion of combustion is supplied either as windbox air or oxygen enriched flue gas recycle via one or more streams. Each burner incorporates combustion stream-proportioning dampers that enable the flow to individual burners to be balanced within the windbox, and to adjust the distribution to the combustion streams within the burner. Adjustment rods connected to the combustion stream proportioning dampers pass through the burner front plate allowing the position of the damper to be adjusted external to the burner.

The streams pass through concentric tubes in the burner, admitting the combustion streams to the furnace at different stages of the combustion process, thereby controlling the local stoichiometry and temperatures and the formation of NOx, particularly when firing with air. One or more dampers on the burner proportion the quantity of the streams within each burner. Adjustment rods connected to the barrel damper(s) pass through the burner front plate allowing the position of the barrel damper to be adjusted during operation of the burner. The necessary swirl is imparted to each stream by separate swirl generators. Adjustment for NOx control is achieved by varying the burner stoichiometry by adjusting the proportion of combustion air or oxygen enriched flue gas recycle between the burner and over-fire combustion windboxes.

The burner also has a core air tube through which the light-up equipment is inserted. Each burner is fitted, inside the core air tube, with a light fuel burner for lighting up, low load coal firing stabilization, and (optionally) partial boiler load carrying. During light-up, a small flow of air is required down this tube to provide combustion oxygen. Air or oxygen enriched flue gas recycle, is used to keep the core air tube free from ash build-up during service. The start-up burners are ignited directly by appropriate spark igniters.

The multi-stage combustion system over-fire air/combustion ports comprise a number of separate combustion streams, such as an inner stream which is unswirled and which delivers the combustion stream to the center of the combustion chamber, and one or more outer streams which are swirled and encourage mixing with the rising flue gases closer to the furnace walls. The degree of swirl and the split between the streams is controlled by simple adjustment rods and set after commissioning.

During boiler operation, the condition of the flame from each burner may be continuously monitored by flame monitoring equipment, providing a remote indication of burner flame conditions to a main control room.

The combustion apparatus of the invention provides full air firing capability with appropriate emission control plant. The balanced draught boiler island design includes full control range suitable for operation using air, oxyfuel or proportions of both. The low NOx Wised pulverized fuel burners are suitable for air or oxyfuel firing or a proportion of both, and also allow multi-stage combustion. The gas-gas heaters 62 are also suitable for use for air and oxyfuel operation.

The combustion apparatus of the invention covers the same range of fuels as is covered by conventional air-fired technology, particularly with respect to the sulphur and chlorine content of the coal. In order to ensure that the oxyfuel boiler plant is no more susceptible to high temperature corrosion due to increased concentrations of $SO_2$ (and $SO_3$) and HCl, the oxyfuel flue gas is cleaned before being recycled to the milling plant 44 and boiler 10. DeSOx plant 68 provides clean oxyfuel flue gas recycle, which ensures that corrosive gaseous components result in concentrations in the boiler 10 which are no worse than that experienced with air-firing.

The total flue gas recycle stream is split into primary and secondary streams. The primary stream quantity is set according to the requirements of the milling plant 44. The secondary stream quantity is set to provide an optimum balance between the combustion equipment and furnace/boiler requirements.

The combustion apparatus of the invention is suitable as a retrofit to existing coal-fired boiler plant or for new coal-fired boiler plant designs, whether subcritical or supercritical. The apparatus allows the use of conventional coal and ash handling and milling (direct or indirect) equipment. The apparatus can selectively and switchably be fired using air or an oxygen enriched gas.

The gas-gas heaters are suitable for use for both 100% air operation and 100% oxyfuel operation and any proportion in between.

In addition to the primary flue gas recycle, the balance of oxygen required is supplied to the radiant furnace via the secondary stream and other multi-stage combustion system gas streams. The apparatus includes the capability to allow separate tuning of the oxygen concentrations in each stream as appropriate. Oxygen is supplied directly to the boiler's combustion equipment, as appropriate, other than that provided to the primary and secondary oxyfuel flue gas streams. Oxygen mixed with recycled flue gas is also supplied to the burners (via the secondary input conduit) and so the burners may utilize staged combustion to minimize the oxidation of nitrogen present in the coal.

Since the coal is supplied to the boiler 10 using a mixture of oxygen and flue gas, ash melting and the formation of NOx and carbon monoxide are substantially reduced. The reduction of premature combustion of the coal increases the efficiency of the combustion apparatus.

The combustion characteristics of the mixture of oxygen and flue gas are similar in some respects to that of air. It is therefore possible to switch between air firing and firing using this mixture without significantly altering the thermal characteristics from the overall combustion apparatus.

The apparatus of the invention can vary the oxygen content during combustion which allows optimum performance regardless of the fuel used (such as low or high volatile coal).

Various modifications and improvements can be made without departing from the scope of the present invention.

What is claimed is:

1. A combustion apparatus including an air fired and oxyfuel fired boiler for generating steam, comprising:
    a combustion chamber;
    at least one axial swirl pulverized coal burner provided at the combustion chamber;
    a primary fuel input conduit connected to the at least one axial swirl pulverized coal burner and configured to supply a pulverized coal fuel to the at least one axial swirl pulverized coal burner;
    a secondary input conduit, separate and distinct from the primary fuel input conduit, which is connected to the at least one axial swirl pulverized coal burner and configured to supply a combustion gas to the at least one axial swirl pulverized coal burner;
    combustion gas supply means including an air supply and a substantially pure oxygen supply;
    an air separation unit configured to separate oxygen from an ambient air feed in order to supply the substantially pure oxygen to the combustion gas supply means, and wherein the combustion gas supply means is configured to variably supply the substantially pure oxygen to both the primary fuel input conduit and the secondary input conduit upstream to the burner; and
    a flue gas recirculation conduit fluidly connected to and configured to supply a recirculated flue gas to at least the primary fuel input conduit and the secondary input conduit upstream to the burner;
    wherein the combustion gas supply means is configured to switchably supply one of air, in a first mode of operation, and a mixture of the substantially pure oxygen and a second gas comprising the recirculated flue gas, in a second mode of operation, to both of the primary fuel input conduit and the secondary input conduit, so that the combustion gas supply means controls the burner to switch between the first mode and the second mode.

2. A combustion apparatus as claimed in claim 1, wherein the second gas does not include air.

3. A combustion apparatus as claimed in claim 1, wherein the second gas does not include nitrogen.

4. A combustion apparatus as claimed in claim 1, wherein the combustion gas supply means includes varying means for varying a proportion of one of air and the mixture of substantially pure oxygen and the second gas supplied to both of the primary fuel input conduit and the secondary input conduit.

5. A combustion apparatus as claimed in claim 4, wherein the varying means comprises a valve.

6. A combustion apparatus as claimed in claim 1, wherein the combustion apparatus comprises a boiler for generating steam.

7. A combustion apparatus as claimed in claim 1, wherein the combustion gas supply means is adapted to supply one of air and the mixture of substantially pure oxygen and the second gas to the primary fuel input conduit such that one of air and the mixture of substantially pure oxygen and the second gas at least assists in transporting the fuel to the combustion chamber.

8. A combustion apparatus as claimed in claim 1, wherein the combustion gas supply means includes at least one fan unit.

9. A combustion apparatus as claimed in claim 1, including at least one tertiary input conduit fluidly connected to the combustion gas supply means for supplying one of air and the mixture of substantially pure oxygen and the second gas directly to at least one of the combustion apparatus and another component of the combustion apparatus.

* * * * *